(12) United States Patent
Nail (10) Patent No.: US 11,388,890 B2
(45) Date of Patent: *Jul. 19, 2022

(54) COVERS FOR TANKS

(71) Applicant: Donald E. Nail, Vancouver, WA (US)

(72) Inventor: Donald E. Nail, Vancouver, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/550,907

(22) Filed: Dec. 14, 2021

(65) Prior Publication Data
US 2022/0125025 A1 Apr. 28, 2022

Related U.S. Application Data (63) Continuation of application No. 16/405,283, filed on May 7, 2019, now Pat. No. 11,229,191.

(60) Provisional application No. 62/667,851, filed on May 7, 2018.

(51) Int. Cl.
*A01K 63/00* (2017.01)
*F16B 5/00* (2006.01)

(52) U.S. Cl.
CPC .......... *A01K 63/006* (2013.01); *F16B 5/0012* (2013.01)

(58) Field of Classification Search
CPC ........ A63H 3/52; A63H 33/044; F16B 5/0012
See application file for complete search history.

(56) References Cited

U.S. PATENT DOCUMENTS

| 1,883,214 A * | 10/1932 | Wilson ...................... B44C 3/12 52/844 |
| 3,132,443 A * | 5/1964 | James .................. A63H 33/044 446/112 |
| D246,194 S * | 10/1977 | Akers .......................... D30/107 |
| 4,086,876 A * | 5/1978 | Moore ................. A01K 63/003 47/69 |
| 4,161,081 A * | 7/1979 | Katzman .................. A63H 3/52 446/314 |
| D259,593 S * | 6/1981 | Gross ........................... D30/104 |
| 4,270,304 A * | 6/1981 | Sofer ................... A63H 33/084 446/124 |
| 4,419,840 A * | 12/1983 | Pope .................... A63H 33/044 446/110 |
| 5,121,710 A * | 6/1992 | Gonzalez ............... A01K 1/033 119/498 |
| 5,394,989 A * | 3/1995 | Delson ................. A61C 19/008 206/83 |
| 5,527,103 A * | 6/1996 | Pittman ................ A47B 47/042 312/265.5 |

(Continued)

FOREIGN PATENT DOCUMENTS

DE 20202137 U1 * 5/2002 .......... A63H 33/044
KR 870002754 Y1 * 8/1987

*Primary Examiner* — Lisa L Tsang (57) ABSTRACT

Novelty covers for a tank including tank walls defining a tank perimeter, the novelty cover including a plurality of panels interconnected to define a frame surrounding a void and defining a frame perimeter, the frame perimeter being complementarily configured with the tank perimeter, wherein each of the panels in the plurality of panels includes an exterior surface with ornamentation the frame is configured to receive the tank in the void, and the ornamentation on the exterior surface of the panels forms a cohesive ornamental scene when the panels are interconnected to define the frame.

20 Claims, 8 Drawing Sheets

(56) References Cited

U.S. PATENT DOCUMENTS

| | | | | |
|---|---|---|---|---|
| 5,580,294 | A * | 12/1996 | Briant | A63H 33/044 446/110 |
| 5,865,660 | A * | 2/1999 | Smith | A63H 33/042 446/106 |
| 5,954,412 | A * | 9/1999 | Rutherford | A01K 63/006 108/162 |
| 6,802,160 | B2 * | 10/2004 | Harambasic | E04B 1/04 446/124 |
| D544,926 | S * | 6/2007 | Kassens | D21/506 |
| D648,077 | S * | 11/2011 | Luong | D30/101 |
| D751,772 | S * | 3/2016 | Allen | D30/106 |
| 2007/0151523 | A1* | 7/2007 | Suteerawanit | A01K 63/003 119/253 |
| 2009/0293814 | A1* | 12/2009 | Rutherford, Jr. | A01K 63/006 119/253 |
| 2010/0300369 | A1* | 12/2010 | Fang | A01K 63/006 119/253 |

* cited by examiner

COVERS FOR TANKS

CROSS REFERENCE TO RELATED APPLICATIONS

This application claims priority to co-pending U.S. application Ser. No. 16/405,283, filed May 7, 2019, which claims priority to provisional U.S. application Ser. No. 62/667,851, filed on May 7, 2018, and both of which are hereby incorporated by reference for all purposes.

BACKGROUND

The present disclosure relates generally to covers. In particular, novelty covers for tanks are described.

Fish tank aquariums and terrariums are a fun and indispensable way to house and display household and exotic pets and animals. For many, having a pet fish or lizard may be a rite of passage as they grow up. For others, the companionship of a low stress and low maintenance house pet like tropical fish or snakes can be a desirable addition to their lives.

Typically, these animals are housed in clear tanks with walls made of glass or plastic. Owners may be creative and fill the tanks with any number of ornaments and decorations to spruce up the habitat of the tank for the animals and to make the tank look more aesthetically pleasing.

However, the glass box of the tank still typically remains unchanged and unappealing. Some may utilize different lids to imitate a roof, but the glass walls of the tank remain bare and exposed. Alternatively, some may paint or apply stickers to the tank to add their own decorations, but these are not easily changed or removed. Thus, there exists a need for tank decorations that cover the tank yet remain easily changeable and removeable to make the tanks more aesthetically appealing to a user.

SUMMARY

The present disclosure is directed to novelty covers for a tank including tank walls defining a tank perimeter, the novelty cover including a plurality of panels interconnected to define a frame surrounding a void and defining a frame perimeter, the frame perimeter being complementarily configured with the tank perimeter, wherein each of the panels in the plurality of panels includes an exterior surface with ornamentation the frame is configured to receive the tank in the void, and the ornamentation on the exterior surface of the panels forms a cohesive ornamental scene when the panels are interconnected to define the frame.

DETAILED DESCRIPTION

The disclosed novelty covers will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various novelty covers are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, elements or method steps not expressly recited.

Terms such as "first", "second", and "third" are used to distinguish or identify various members of a group, or the like, and are not intended to denote a serial, chronological, or numerical limitation.

"Coupled" means connected, either permanently or releasably, whether directly or indirectly through intervening components.

Novelty Covers for Tanks

With reference to the figures, novelty covers for tanks will now be described. The novelty covers for tanks discussed herein function to cover a tank in a fun, creative, and decorative fashion. The presently described novelty covers cover the walls and top of a tank while remaining easily removeable and interchangeable because of their modular components.

The novelty covers discussed below address many of the shortcomings existing with conventional tank covers and decorations. For example, the novelty covers easily disconnect at their corners and edges to lay flat. This makes shipping and storage easy and affordable.

Further, the novelty covers fit over a tank, include a standard sized ten-gallon tank, without attaching directly to the tank. This makes the novelty covers easily removable and moveable by simply lifting the novelty cover up and over the tank.

Further, the novelty covers fit together using finger joints and pins and do not require additional tools to assemble or disassemble. The ability to be assembled and disassembled without tools adds to the mobility, convenience, and accessibility of the novelty covers.

Additionally, the novelty covers may come in many different shapes, colors, and designs to provide users with a wide variety of creative options. In many instances, the novelty covers create a cohesive ornamental scene when assembled around a tank. Further addressing the need for users to creatively express themselves, the novelty covers may have alternate attachment pieces to customize the novelty covers to a user's preferences.

Tank

Figure 7:
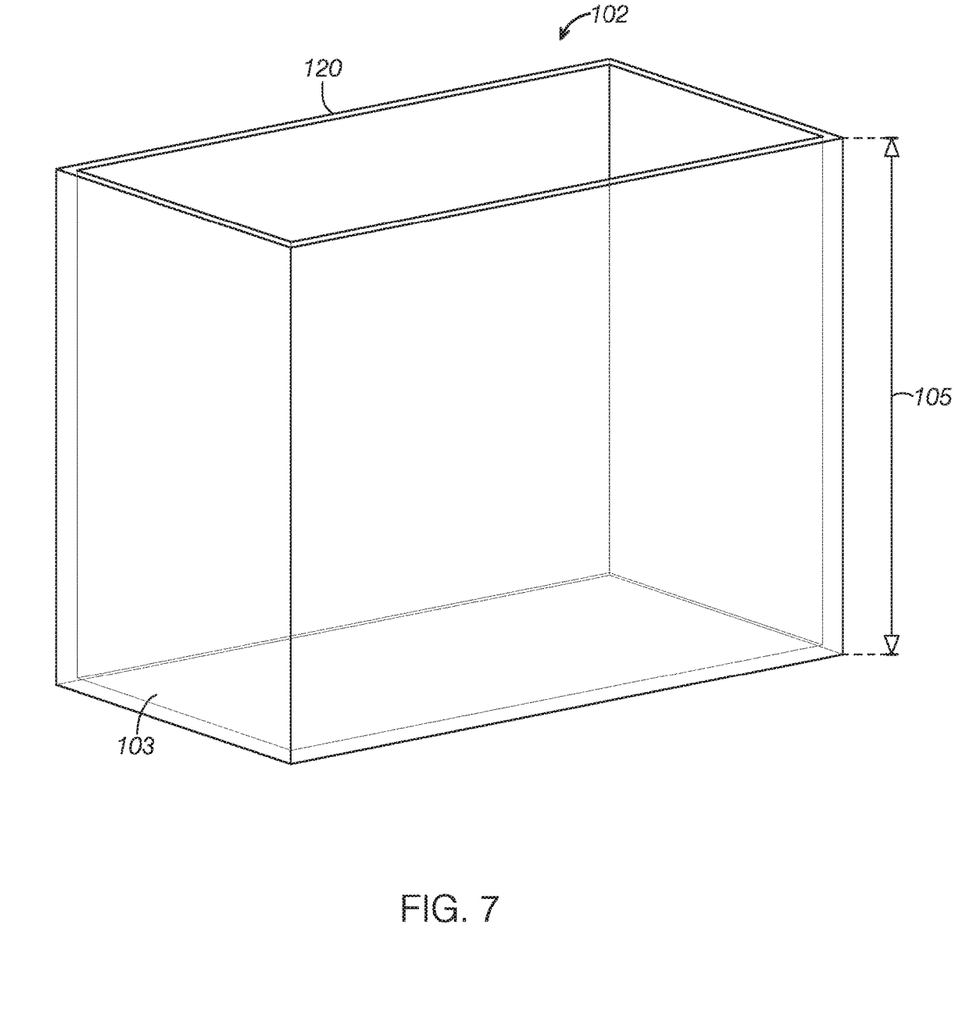
FIG. 7 is a perspective view of a tank suitable to be covered by the novelty covers shown in FIGS. 1-6.
Figure 8:
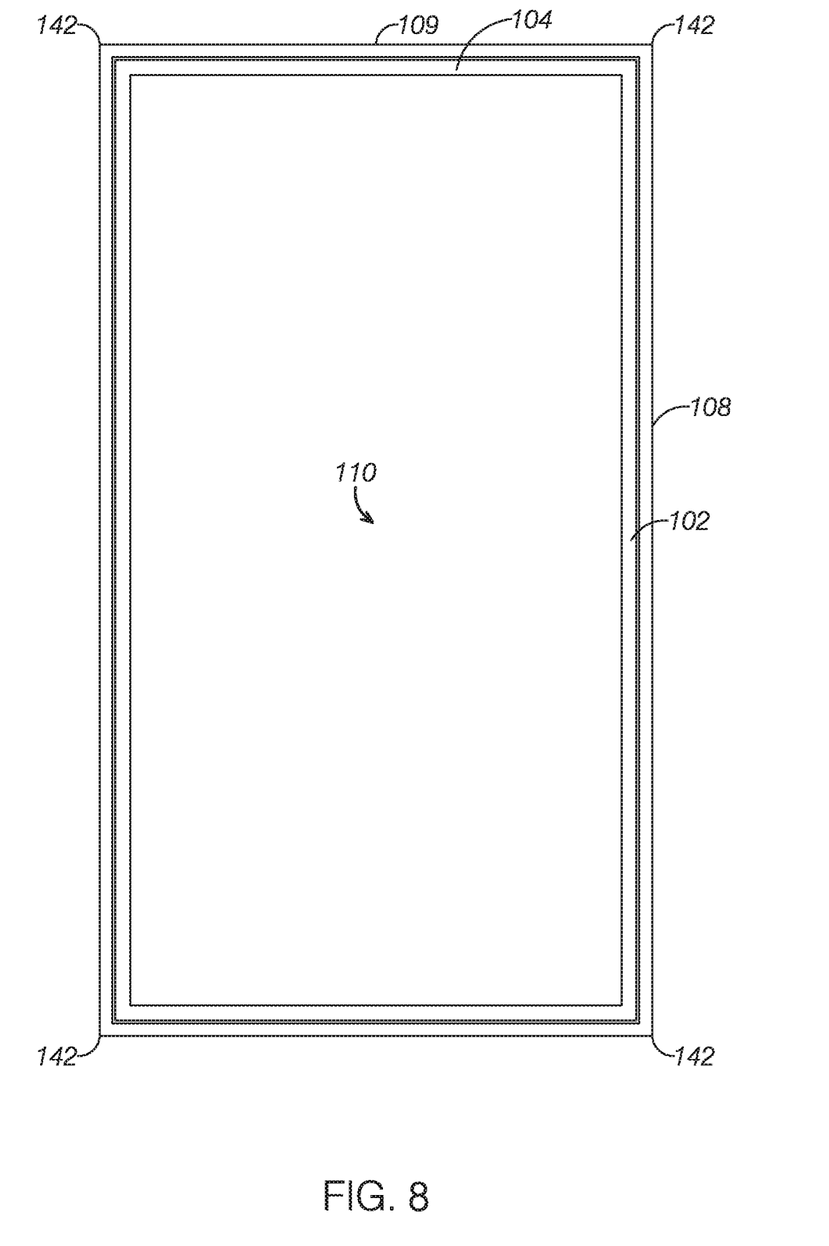
FIG. 8 is a schematic top view of the tank shown in FIG. 7 disposed inside a frame of the novelty cover shown in FIGS. 1-4 depicting the complementary perimeters of the tank and the frame.

With reference to FIGS. 7 and 8, the features of tank 102 will first be described to aid the discussion of the novelty covers disclosed herein. As shown in FIG. 7, tank 102 includes four tank walls 103 defining a tank perimeter 104 with a top 120 disposed vertically above tank walls 103.

Tank 102 is a standard sized ten-gallon tank with a tank height 105 of 12 inches. The length, width, and height dimensions of tank 102 are 20 inches, 10 inches, and 12 inches, respectively. However, other tanks come in a wide variety of different dimensions and all such dimensions are suitable for use with the novelty covers described herein.

In the present example, tank walls 103 are made of glass. Some tank or aquarium examples may include walls made of plastic and have one or more walls that are not transparent.

The perimeter of tank 102 is rectangular, but suitable tanks may have other shapes and/or more or less than four walls. For example, some tanks may be triangular, square, circular, a pentagon, another regular polygon, or an irregular shape, each with a corresponding number of walls, such as three walls for a triangular shaped tank, etc.

Novelty Cover Embodiment One

With reference to FIGS. 1-4 and 8, a first example of a novelty cover, novelty cover 100, will now be described. Novelty cover 100 includes a plurality of panels 106, a cover 122, and four joint caps 144.

In some examples, the novelty cover does not include one or more features included in novelty cover 100. For example, some novelty cover examples do not include a cover or a joint cap.

In other examples, the novelty covers includes additional or alternative features. For example, some novelty cover examples include lights, electronic displays, clocks, calendars, writing surfaces, such as chalk boards or dry erase boards, and cord and/or tubing organizers. Additionally or alternatively, the novelty covers may include accessory display items, such as statues, figurines, plush toys, and pictures, in some examples.

Plurality of Panels

As can be seen in FIGS. 1-3 and 8, plurality of panels 106 interconnect to define a frame 108 surrounding a void 110.

As shown in FIG. 8, frame 108 defines a frame perimeter 109, which is complementarily configured with tank perimeter 104. Frame 108 is self-supporting in the sense that it holds together upright without support from tank 102 or another external object.

In the present example, plurality of panels 106 includes four separate panels: first panel 150, second panel 152, third panel 154, and fourth panel 156. In other examples, the plurality of panels include more or less panels, such as three panels, five panels, and six or more panels.

Each of the panels in plurality of panels 106 includes an exterior surface with ornamentation. For example, first panel 150 includes exterior surface 114 with ornamentation 116 in the form of a parapet. The ornamentation on the exterior surfaces of the panels collectively form a cohesive ornamental scene 118 when the panels are interconnected to define frame 108.

Figure 1:
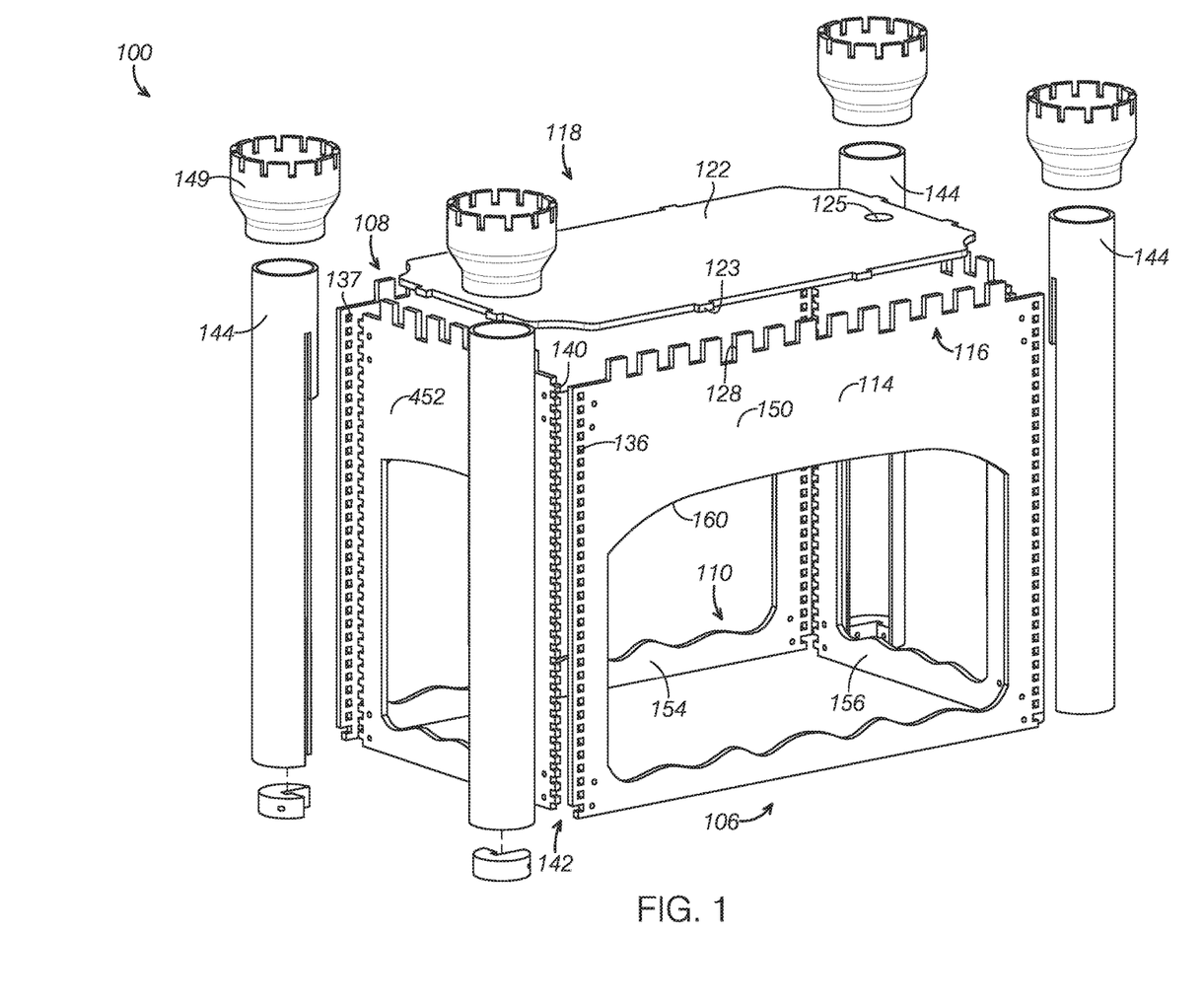
FIG. 1 is a perspective view of a first example of a novelty cover for a tank.
Figure 2:
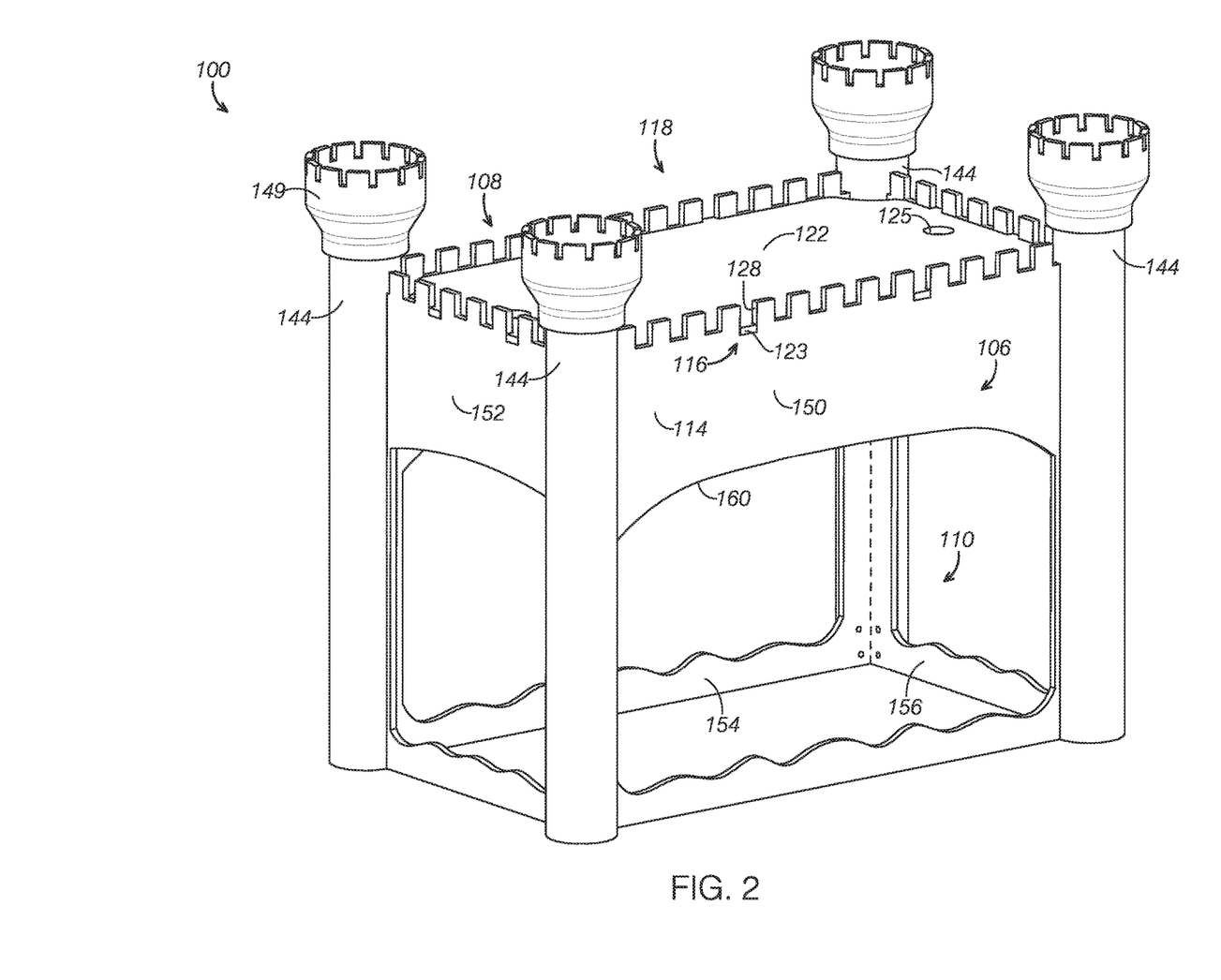
FIG. 2 is an exploded view of the novelty cover shown in FIG. 1.
Figure 3:
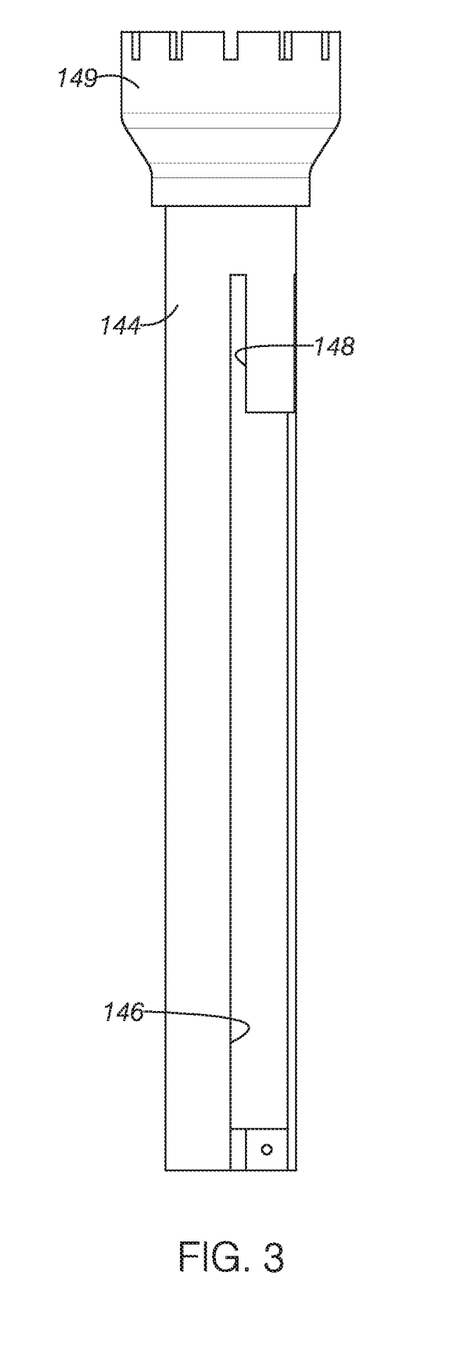
FIG. 3 is a plan view of a joint cap that is configured to mount to a corner of the novelty cover shown in FIG. 1.

The ornamentation and the cohesive ornamental scene can take a wide variety of forms. For example, cohesive ornamental scene 118 in FIGS. 1-3 is a castle. As shown in FIGS. 1-3, each panel includes ornamentation depicting features of a castle, such as stone walls, a drawbridge, windows, and a parapet.

Figure 5:
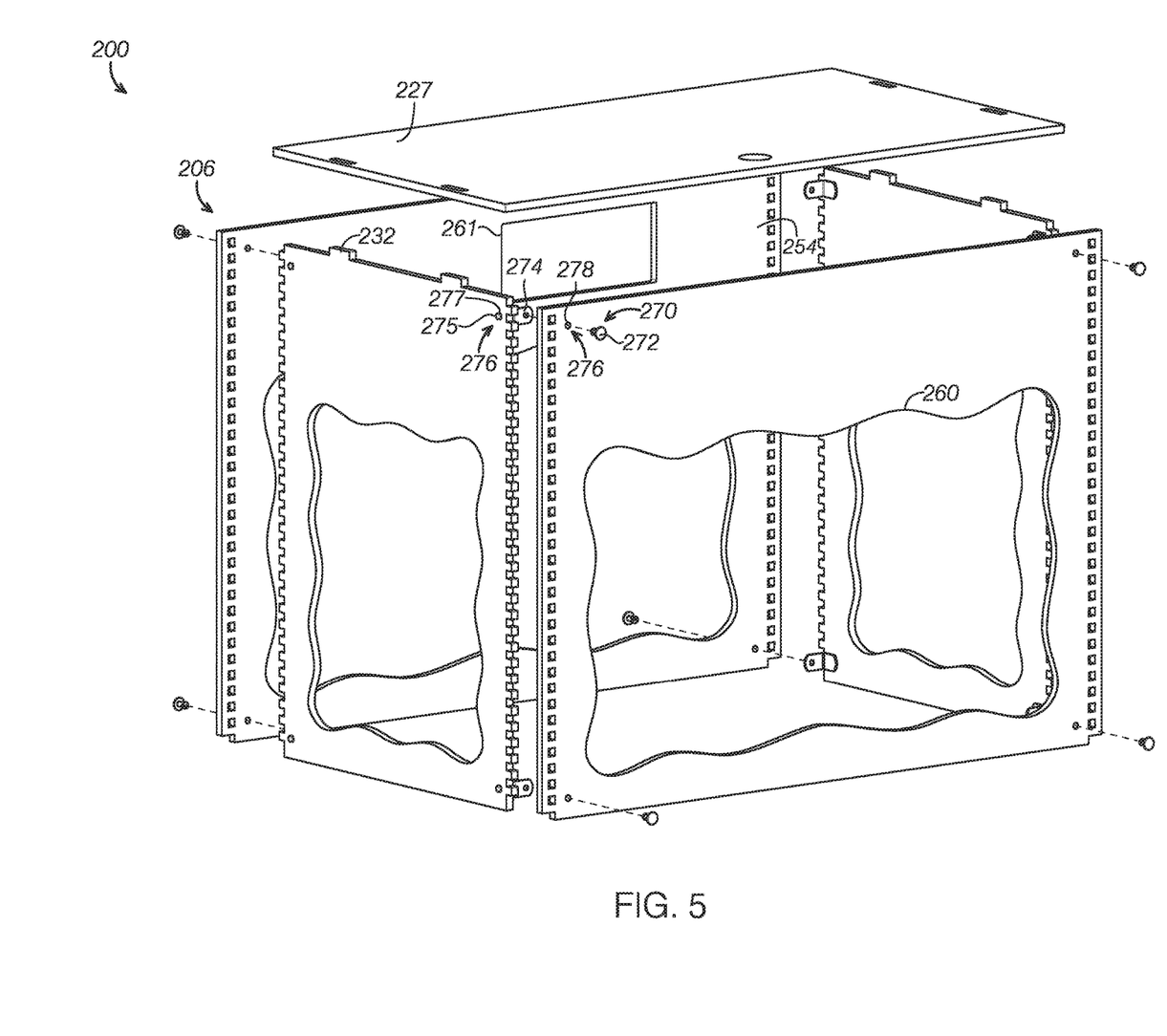
FIG. 5 is an exploded view of a second example of a novelty cover for a tank.
Figure 6:
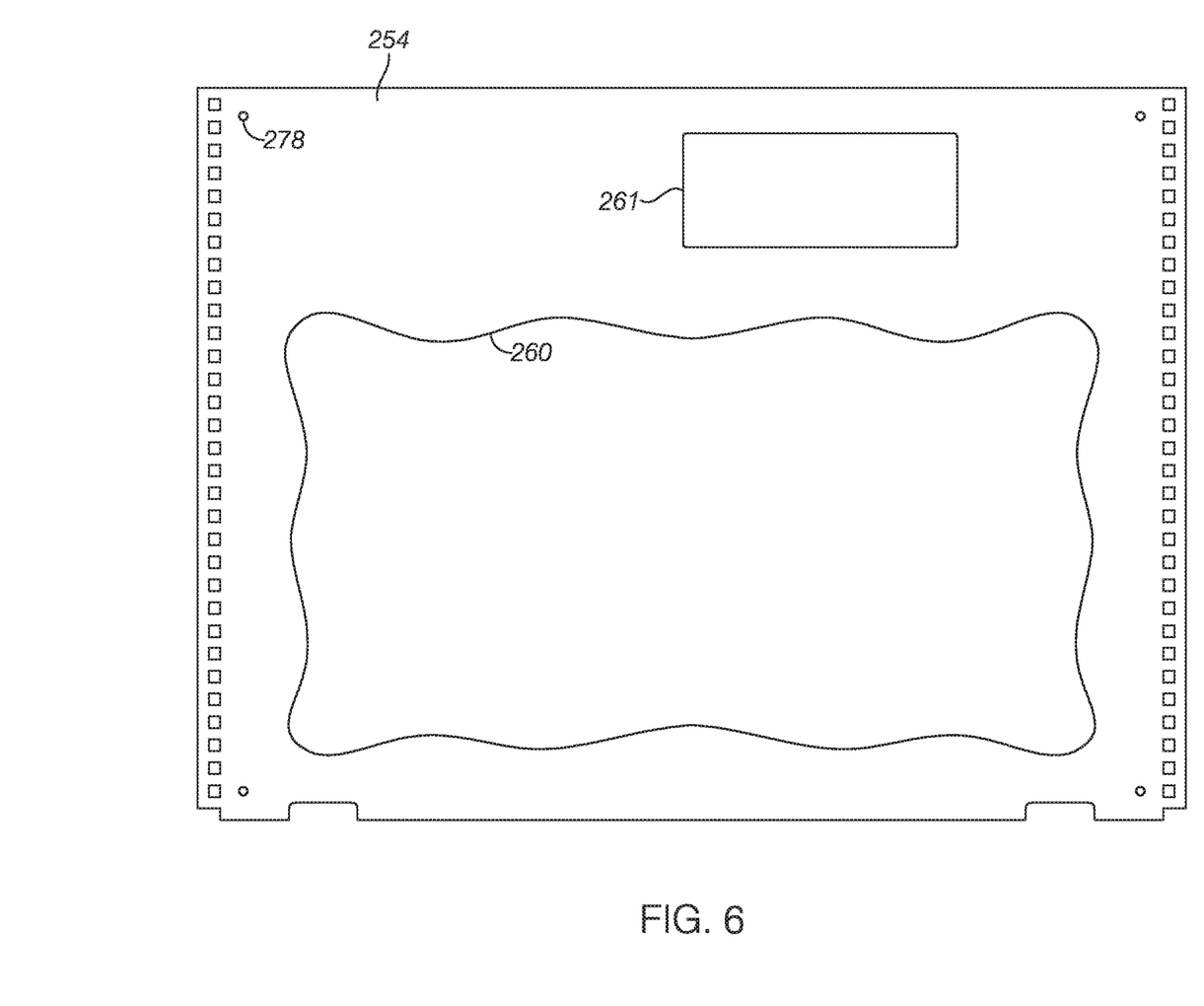
FIG. 6 is a plan view of a panel included in the novelty cover for a tank shown in FIG. 5 depicting an accessory aperture.

In other examples, such as shown in FIGS. 5 and 6, the cohesive ornamental scene is a treasure chest. In other examples, the cohesive ornamental scene is a pagoda. In some examples, the cohesive ornamental scene is an abstract design, a space ship, a jungle, a house, an Egyptian pyramid, a sports arena, or a circus. There is almost no limit on the range of cohesive ornamental scenes the panels may collectively display when interconnected to define the frame.

As shown in FIGS. 1, 2, and 8, frame 108 is configured to receive tank 102 in void 110. To receive tank 102 in void, a user may place assembled frame 108 over tank 102, may place tank 102 into void 110 of assembled frame 108, or may assemble frame 108 from plurality of panels 106 around tank 102. The reader can see from FIG. 8 that frame perimeter 109 is complementarily configured with tank perimeter 104 so that void 110 is complementarily configured with tank 102. The complementary configuration in the novelty cover 100 example provides a close tolerance leaving relatively little space between frame 108 and tank 102. In other novelty cover examples, the tolerance is more relaxed to provide more space between the frame and the tank. In still other examples, the tolerance is tighter to provide little or no space between the tank and the frame.

In the example shown in FIGS. 1 and 2, plurality of panels 106 each have a panel height greater than or equal to tank height 105. The panel heights being greater than tank height 105 means that tank 102 is vertically enclosed by frame 108 when received in void 110. In other examples, the height of the panels is equal to or less than the height of the tank.

With reference to FIGS. 1 and 2, the reader can see that first panel 150 in plurality of panels 106 defines a notch 128 proximate where top 120 of tank 102 would be disposed when tank 102 is disposed in void 110. As explained in more detail below, cover 122 is configured to couple with frame 108 in a position overlying top 120 of tank 102 when tank 102 is received in void 110. Thus, notch 128 is in a position proximate to cover 122 when cover 122 is coupled to frame 108 in a position overlying top 120. Notch 128 is complementarily configured with a cover projection 123 to receive cover project 123 in notch 128 to horizontally stabilize cover 122.

As shown in FIGS. 1 and 2, first panel 150 defines a window 160 permitting tank 102 to be seen through first panel 150 when tank 102 is received in void 110 of frame 108. In the example shown in FIGS. 1 and 2, second panel 152, third panel 154, and fourth panel 156 also define windows through which tank 102 can be observed from outside frame 108. In some examples, fewer than all panels define windows, such as a single panel, two panels, or three panels defining a window.

In the example shown in FIGS. 1 and 2, window 160 consists of an absence or hole through first panel 150. In other examples, the windows may be a clear material integrated into the panels. In certain examples, the windows are an absence of panel material and include glass or another clear material covering them.

The reader can see in FIGS. 1 and 2 that window 160 represents a major portion of first panel 150. In this context, major portion means the area of first panel 150 defining window 160 is greater than the area of first panel 150 not defining window 160. Expressed another way, window 160 represents more than half the area defined by exterior surface 114. The larger the window area, the less that tank 102 is obscured by the panel, which enables a user to view more of tank 102 and its contents.

With reference to FIGS. 1 and 2, the reader can see that first panel 150 defines a series of holes 136 proximate outer edges of first panel 150. Third panel 154 defines a similar series of holes 137 to series of holes 136. The reader can also see that second panel 152 includes a series of projections 140 proximate outer edges of second panel 152. Series of projections 140 are configured to matingly engage series of holes 136 in first panel 150 as well as series of holes 137 defined in third panel 154.

Series of projections 140 matingly engaging series of holes 136 interconnects second panel 152 with first panel 150. Likewise, series of projections 140 matingly engaging series of holes 137 interconnects second panel 152 with third panel 154. By configuring two opposite panels with a series of holes and two adjacent panels with a series of projections, the series of panels matingly engage to interconnect as a rectangle. Thus, as shown in FIG. 8, in the present example, tank perimeter 104 is rectangular and frame perimeter 109 is correspondingly rectangular. Wherein two panels interconnect defines a vertically extending joint 142.

In some examples, the interconnected panels are secured together proximate vertically extending joint 142 with fasteners while in other examples fasteners are not used. In examples where fasteners are used, such as the example shown in FIGS. 5 and 6, the fasters may be operable by hand without requiring tools.

For example, some examples include hand screw fasteners to secure the panels together, such as two hand screw fasteners per vertical edge of the frame. The hand screw fasteners include a screw configured to be operated by hand and a bracket configured to receive the hand screw. When hand screw fasteners are used, the panels may include complementary hole-pairs in adjacent panels to accommodate the hand screw fastener: one type of hole configured to mount the bracket via a bracket projection and another type of hole through which the hand screw may pass to reach the bracket mounted to the adjacent panel. In use, a user secures the bracket to one of the panels (or the bracket comes preinstalled on the panel) and then the user inserts the hand screw through the other hole in the hole-pair formed in the adjacent panel and into the bracket to secure the adjacent panels together.

Cover

Figure 4:
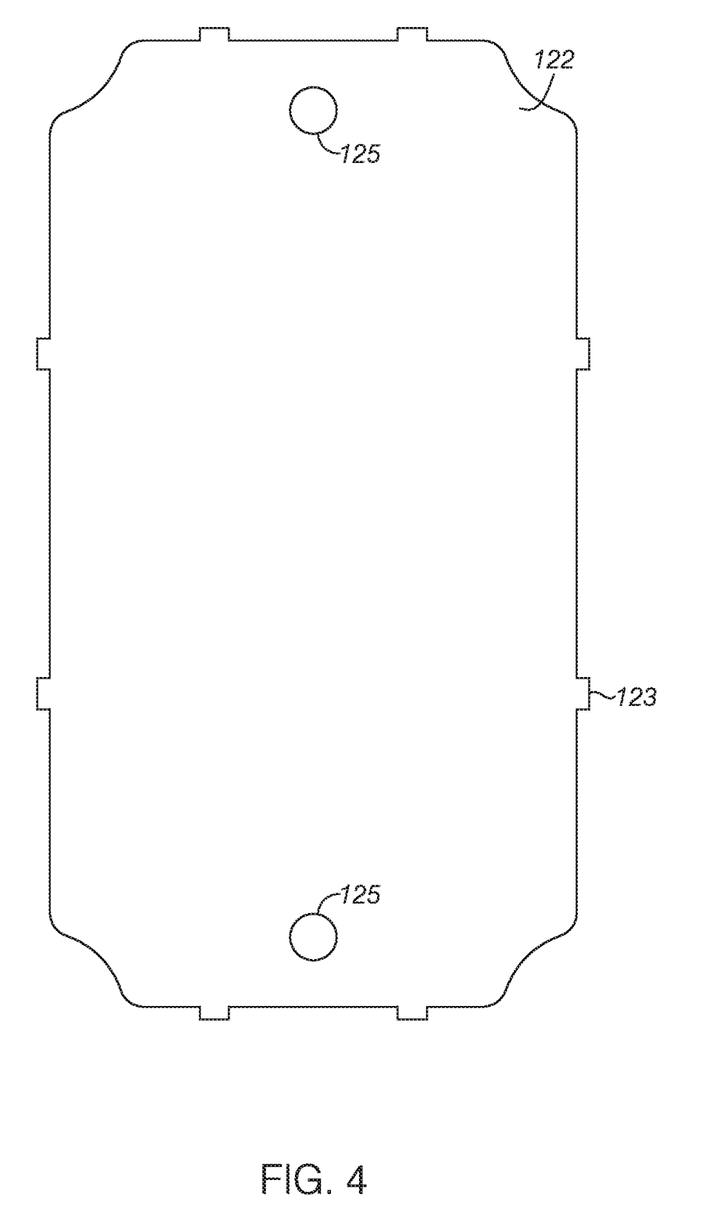
FIG. 4 is a top view of a cover configured to mount to the top of the novelty cover.

With reference to FIGS. 1, 2 and 4, the reader can see that cover 122 is configured to couple with frame 108 in a position overlying top 120 of tank 102 when tank 102 is received in void 110. Cover 122 is unadorned, but some examples will include adornments or accessory display items, such as statues, figurines, plush toys, and pictures. For example, when the cohesive ornamental scene is a pagoda, the cover may include adornments in the form of dragon statue replicas.

As shown in FIGS. 1, 2 and 4, cover 122 includes a series of cover projections 123 configured to rest in notches 128 formed in first panel 150, second panel 152, third panel 154, and fourth panel 156. Projections 123 residing in notches 128 serves to horizontally stabilize cover 122 on frame 108. In other examples, such as the example shown in FIG. 5, the cover defines one or more cover apertures complementarily configured with vertical projections extending from the panels. The cover apertures are aligned with the vertical projections and receive the vertical projections to orient and laterally stabilize the cover.

In the present example, cover 122 includes finger holes 125 to facilitate lifting cover 122. In other examples, finger holes are not defined in the cover. Additionally or alternatively to finger holes, the cover may include handles to facilitate lifting and maneuvering the cover.

Joint Cap

With reference to FIGS. 1-3, the reader can see that novelty cover 100 includes four joint caps 144 mounted to four vertically extending joints 142. In other examples of the novelty cover, joint caps are not provided at all or fewer joint caps than the number of vertically extending joints present are provided. Joint caps 144 press two adjacent panels together to more securely interconnect them when mounted to vertically extending joint 142 defined between the adjacent panels.

The reader can see from FIGS. 1-3 that joint caps 144 have an ornamental exterior appearance, including a cap 149 depicting a turret, which complements the ornamentation on the exterior surfaces of the panels. In the present example, joint caps 144 appear as castle turrets to complement the castle cohesive ornamental scene created by frame 108. In examples where the cohesive ornamental scene is a spaceship, the joint caps may appear as rocket engines. The reader will appreciate that the joint caps may adopt any external ornamentation suitable to complement the cohesive ornamental scene presented by the frame.

With reference to FIGS. 2 and 3, one can see that joint caps 144 each define a vertically extending recess 146 complementarily configured with vertically extending joints 142. As shown in FIG. 3, joint cap 144 defines a slit 148 vertically adjacent to vertically extending recess 146. Slit 148 is complementarily configured with a minor dimension of the panels in plurality of panels 106. The minor dimension of the panels corresponds to the thickness of the panels. Expressed another way, the minor dimension is the spacing distance between the exterior and interior faces of the panels.

The complementary configurations of recess 146 and slit 148 relative to vertically extending joint 142 and the minor dimension of the panels, respectively, allows joint caps 144 to mount securely to frame 108 at the four vertically extending joints 142. In particular, joint cap 144 receives vertically extending joint 142 in vertically extending recess 146. Further, slit 148 receives a portion of a panel; more specifically, slit 148 receives one of the two panels interconnected to form vertically extending joint 142.

Novelty Cover Embodiment Two

Turning attention to FIGS. 5 and 6, a second example of a novelty cover, novelty cover 200, will now be described. Novelty cover 200 includes many similar or identical features to novelty cover 100. Thus, for the sake of brevity, each feature of novelty cover 200 will not be redundantly explained. Rather, key distinctions between novelty cover 200 and novelty cover 100 will be described in detail and the reader should reference the discussion above for features substantially similar between the two novelty covers.

As can be seen in FIG. 5, novelty cover 200 includes a plurality of panels 206 and a cover 222. In contrast to the castle cohesive ornamental scene presented by novelty cover 100, novelty cover 200 presents a sea chest cohesive ornamental scene. Plurality of panels 206 define windows 260 through which a tank and its contents may be observed.

FIGS. 5 and 6 show that novelty cover 200 has a different configuration for securing the cover to the plurality of panels than present in the novelty cover 100 example. In the novelty cover 200 example, plurality of panels 206 define vertical projections 232 proximate cover 222 and cover 222 defines cover apertures 227 complementarily configured with vertical projection 232. Cover apertures 227 align with vertical projections 232 and receive vertical projections 232 to orient and laterally stabilize cover 222.

As shown in FIGS. 5 and 6, a panel 254 in plurality of panels 206 defines an accessory aperture 261. Accessory aperture 261 provides access to a tank disposed in novelty cover 200 for accessories located outside novelty cover. Additionally or alternatively, accessory aperture 261 provides a place to mount accessories to panel 254. Common accessories for which it is beneficial to provide access to the tank are pumps, filtration units, lamps, food dispensers, and water dispensers. The accessory aperture may be sized and shaped to complement any desired accessory.

As shown in FIG. 5, novelty cover 200 includes hand screw fasteners 270 to help secure plurality of panels 206 together. In particular, novelty cover 200 includes two hand screw fasteners 270 per vertical edge of the frame. Hand screw fasteners include a screw 272 configured to be operated by hand and a bracket 274 configured to receive hand screw 272.

In FIGS. 5 and 6, the reader can see that plurality of panels 206 defines complementary hole-pairs 276 in adjacent panels to accommodate hand screw fastener 270. A first hole 277 in hole-pair 276 is configured to mount bracket 274 via a bracket projection 275. A second hole 278 in hole-pair 276 is configured for screw 272 to extend through it to reach bracket 274.

In use, a user secures bracket 274 to one of the panels (or bracket 274 comes preinstalled on the panel) via first hole 277. To secure the panels together, the user inserts hand screw 272 through second hole 278 formed in the adjacent panel and then into bracket 274 to secure the adjacent panels together.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A novelty cover comprising:
  a plurality of panels interconnectable to define a frame,
    wherein the frame defines a void configured to receive an object,
    wherein the object is defined by a perimeter, and
    wherein two adjacent panels of the plurality of panels interconnect to define a vertically extending joint,
  a joint cap mounted to the vertically extending joint to secure the two adjacent panels to each other,
    wherein a height of the joint cap is greater than a height of the vertically extending joint;
    wherein a lower portion of the joint cap defines a vertically extending recess complementarily configured with a lower portion of the vertically extending joint;
    wherein the joint cap defines a vertically oriented slit adjacent to and extending upwardly from the vertically extending recess to at least the height the vertically extending joint;
    wherein a length of the slit and a length of the vertically extending recess together is at least equal to a height of the two adjacent panels;
    wherein the joint cap receives the vertically extending joint in the vertically extending recess;
    wherein the slit receives an upper portion of one of the two adjacent panels so that the lower portion of the joint cap does not interfere with the two adjacent panels; and
    wherein the lower portion of the joint cap is exterior to the two adjacent panels of the plurality of panels that interconnect to define the vertically extending joint.

2. The novelty cover of claim 1,
  wherein the slit is a first slit that receives the upper portion of a first one of the plurality panels,
  wherein a second slit extends upwardly to at least the height the vertically extending joint,
  wherein the second slit receives the upper portion of a second one of the plurality of panels; and
  wherein the first one of the plurality panels is adjacent to the second one of the plurality panels.

3. The novelty cover of claim 2,
  wherein the length of the first slit is the same as a length of the second slit.

4. The novelty cover of claim 1,
  wherein each of the panels in the plurality of panels includes an exterior surface with ornamentation.

5. The novelty cover of claim 1, further comprising:
a cover configured to couple with the frame in a position to define a top of the novelty cover.

6. The novelty cover of claim 5, wherein the cover defines a finger hole to facilitate lifting of the cover.

7. The novelty cover of claim 5,
wherein a first panel in the plurality of panels defines a notch proximate the cover; and
wherein the cover includes a cover projection configured to rest in the notch to horizontally stabilize the cover.

8. The novelty cover of claim 5,
wherein a first panel in the plurality of panels defines a vertical projection proximate the cover; and
wherein the cover defines a cover aperture complementarily configured with the vertical projection and aligned with the vertical projection, the cover aperture receiving the vertical projection to orient and laterally stabilize the cover when the cover covers the object.

9. The novelty cover of claim 1,
wherein the plurality of panels each have a panel height greater than or equal to a height of the object such that the object is enclosed by the frame when received in the void.

10. The novelty cover of claim 1, wherein at least one panel in the plurality of panels defines a window permitting the object to be seen through the at least one panel when the object is received in the void of the frame.

11. The novelty cover of claim 10, wherein the window consists of an absence in the at least one panel.

12. The novelty cover of claim 1, wherein the plurality of panels includes:
a first panel defining a series of holes; and
a second panel including a series of projections configured to matingly engage the series of holes in the first panel to interconnect the first panel with the second panel.

13. The novelty cover of claim 1, wherein the perimeter of the object is rectangular, wherein the frame is defined by a frame perimeter, and wherein the frame perimeter is correspondingly rectangular.

14. The novelty cover of claim 1, wherein an upper portion of the joint cap presses the two adjacent panels together and more securely interconnects the two adjacent panels when mounted to the vertically extending joint.

15. The novelty cover of claim 1, wherein the joint cap has an ornamental exterior appearance.

16. The novelty cover of claim 1, further comprising:
a cap configured to cover a top of the joint cap.

17. The novelty cover of claim 1,
wherein the plurality of panels is a first panel, a second panel, a third panel, and a fourth panel,
wherein each of the first panel, the second panel, the third panel, and the fourth panel are defined by a first side edge and an opposing second side edge, a top edge and a bottom edge,
wherein the vertically extending joint is a first vertically extending joint that is defined by the first side edge of the first panel and the second side edge of the second panel,
wherein a second vertically extending joint is defined by the first side edge of the second panel and the second side edge of the third panel,
wherein a third vertically extending joint is defined by the first side edge of the third panel and the second side edge of the fourth panel,
wherein a fourth vertically extending joint is defined by the first side edge of the fourth panel and the second side edge of the first panel,
wherein the joint cap is a first joint cap mounted to the first vertically extending joint,
wherein the novelty cover further comprises:
a second joint cap mounted to the second vertically extending joint;
a third joint cap mounted to the third vertically extending joint; and
a fourth joint cap mounted to the fourth vertically extending joint,
wherein the second joint cap, the third joint cap and the fourth joint cap each define a vertically extending recess complementarily configured with a lower portion of the corresponding vertically extending joint.

18. The novelty cover of claim 17, further comprising:
wherein a height of the second joint cap, the third joint cap and the fourth joint cap is greater than a height of the corresponding vertically extending joint.

19. The novelty cover of claim 17, further comprising:
wherein the second joint cap, the third joint cap and the fourth joint cap each include a first vertically oriented slit and a second vertically oriented slit that extend from the corresponding vertically extending recess, and
wherein the first vertically oriented slit and the second vertically oriented slit each extend upwardly to at least the height the corresponding vertically extending joint.

20. The novelty cover of claim 19, further comprising:
wherein a length of the first and second slits and the length of the corresponding vertically extending recess together is at least equal to a height of the corresponding two adjacent panels, and
wherein the first and second slits each receive a corresponding upper portion of one of the corresponding two adjacent panels so that the lower portion of the corresponding joint cap does not interfere with the corresponding two adjacent panels.

* * * * *